Jan. 3, 1939.  W. T. McKAY  2,142,202
IRONING AND PRESSING MACHINE
Filed Jan. 26, 1934  9 Sheets-Sheet 8
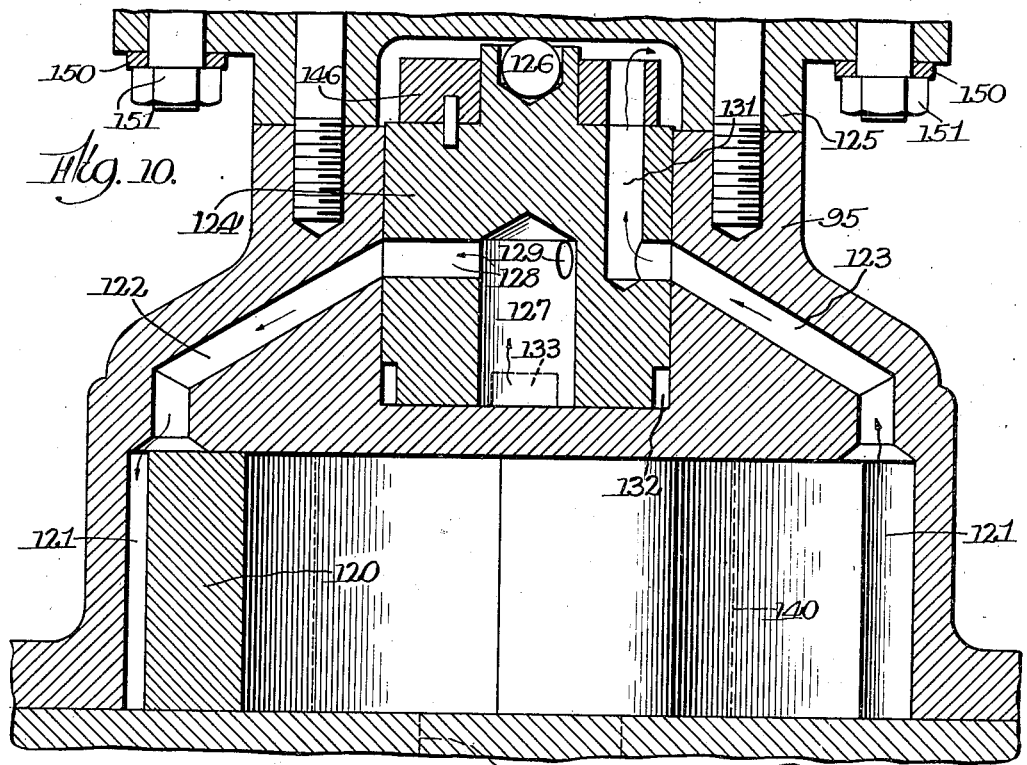
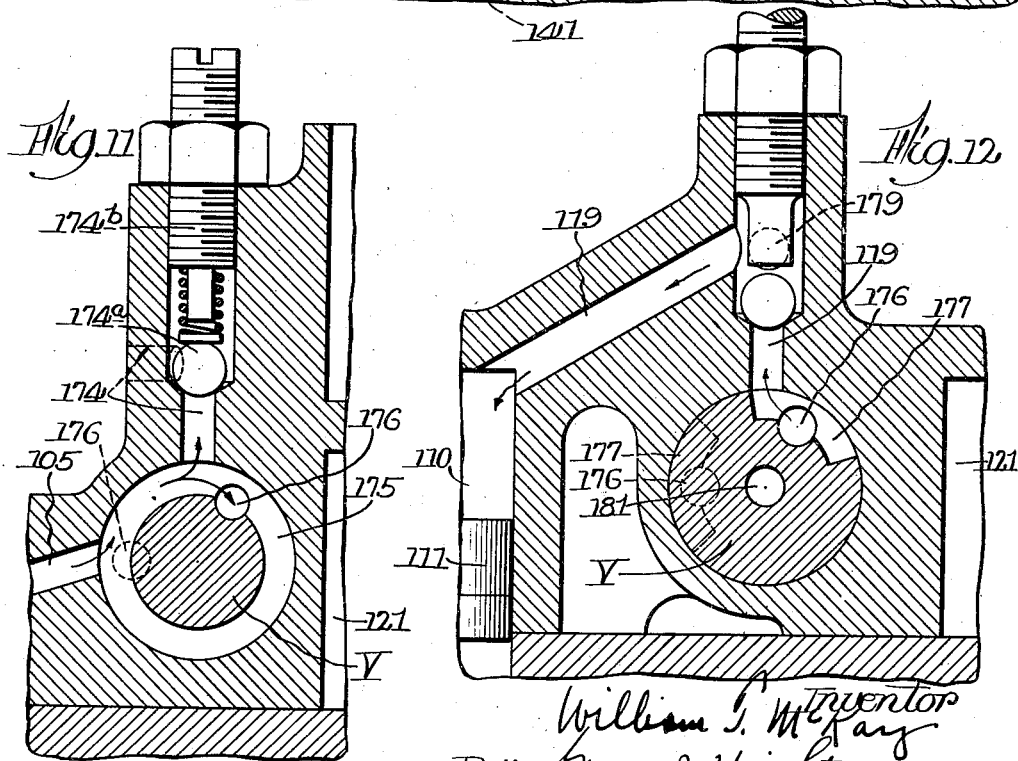

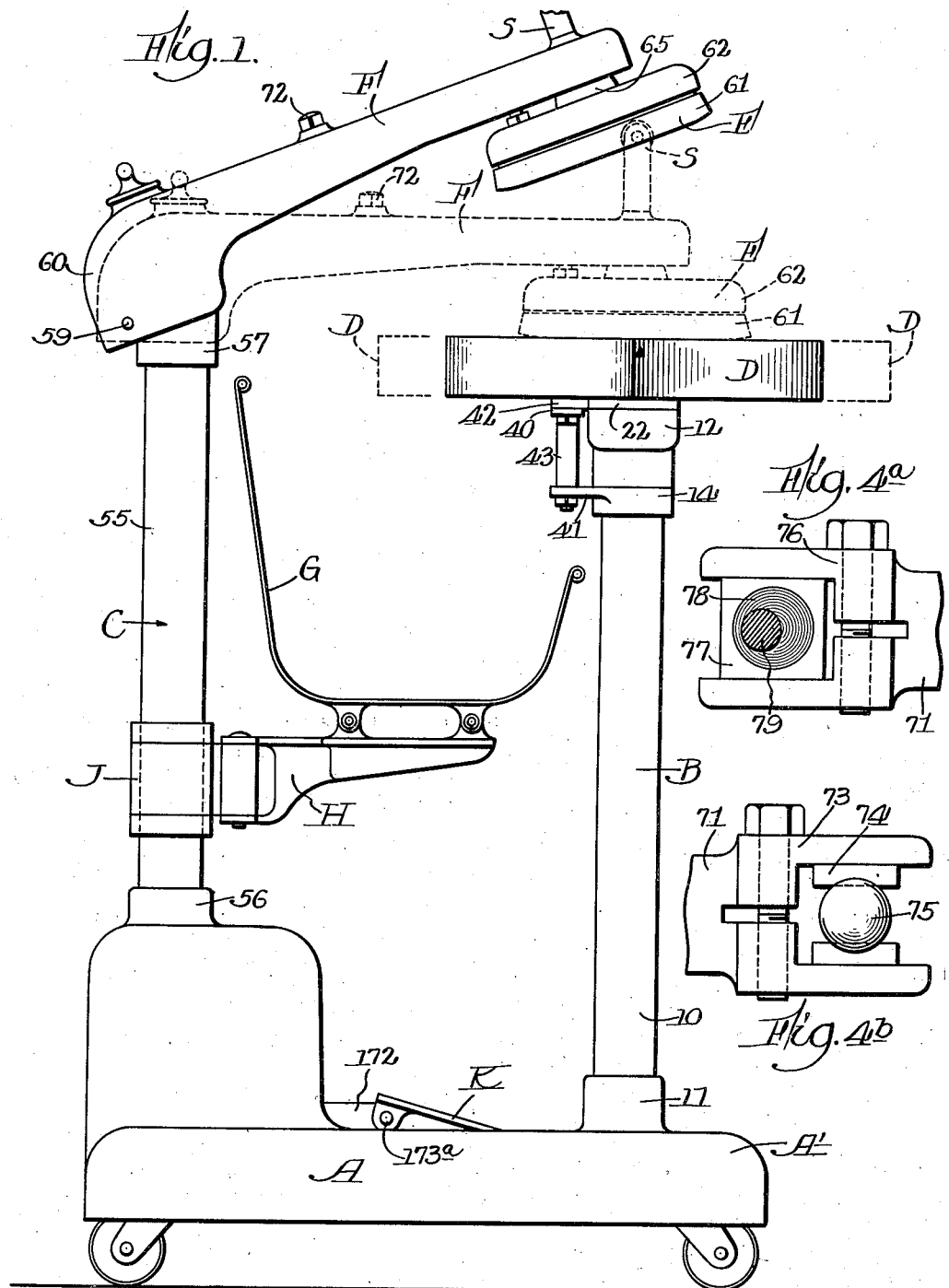

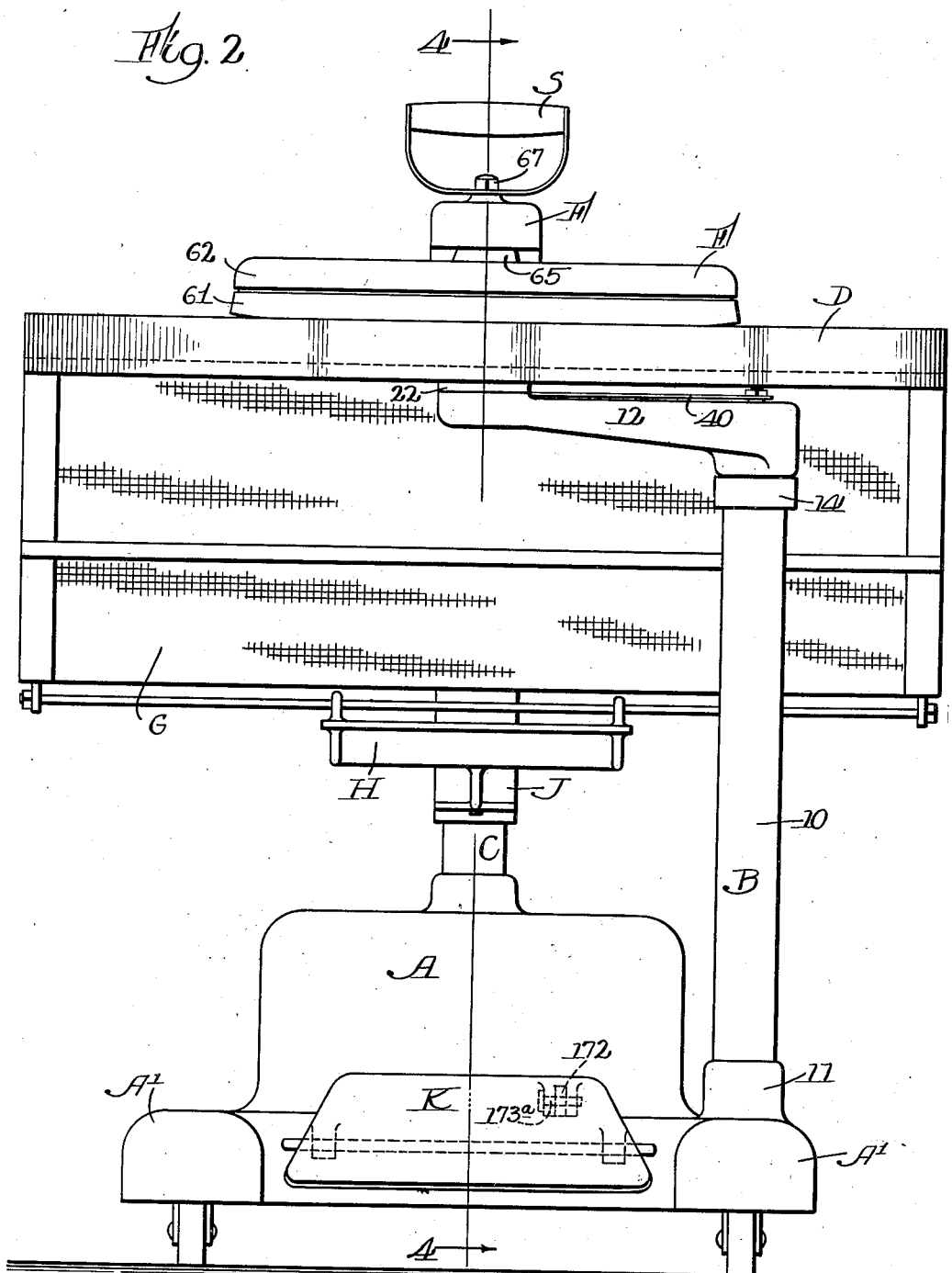

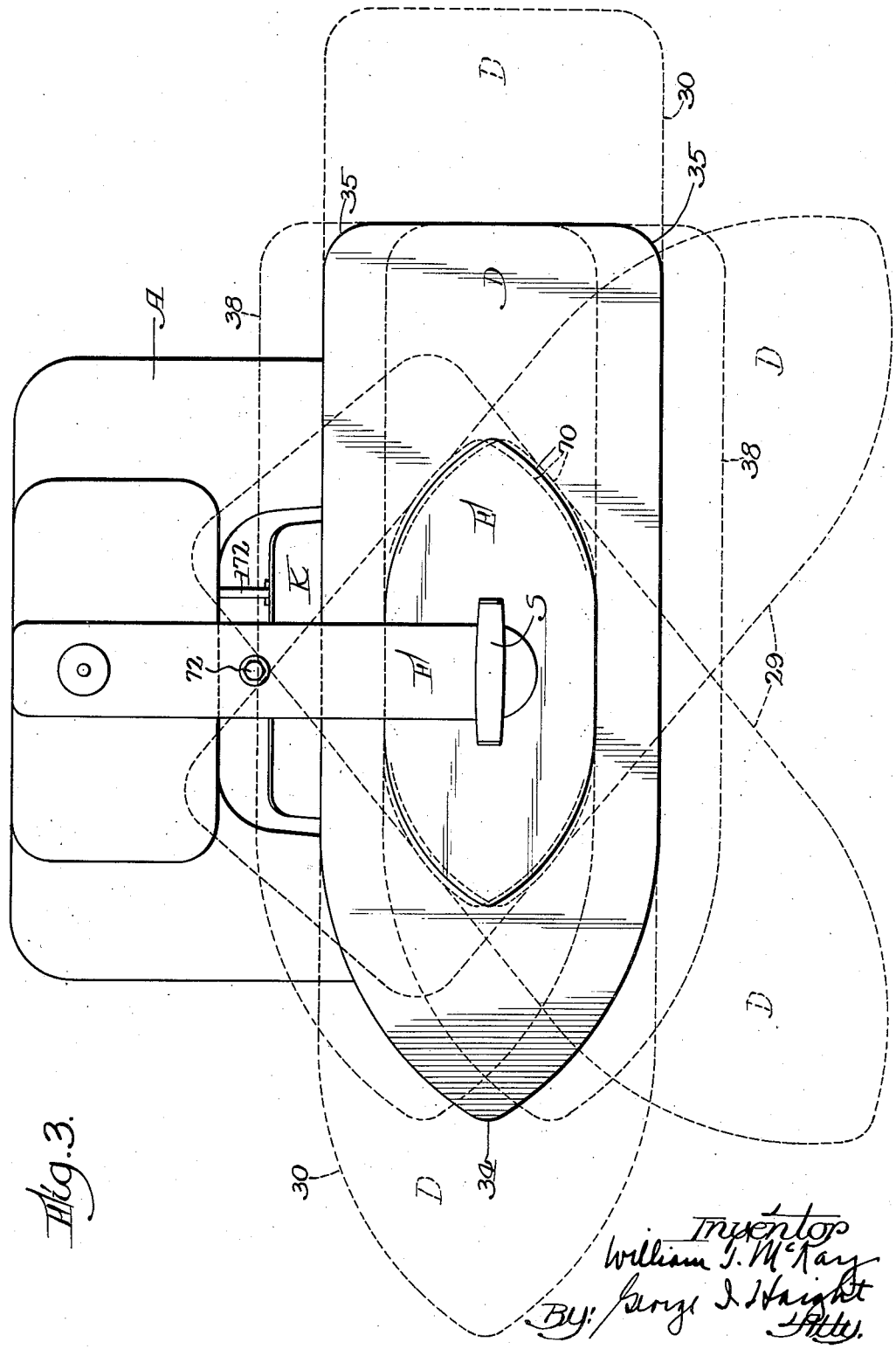

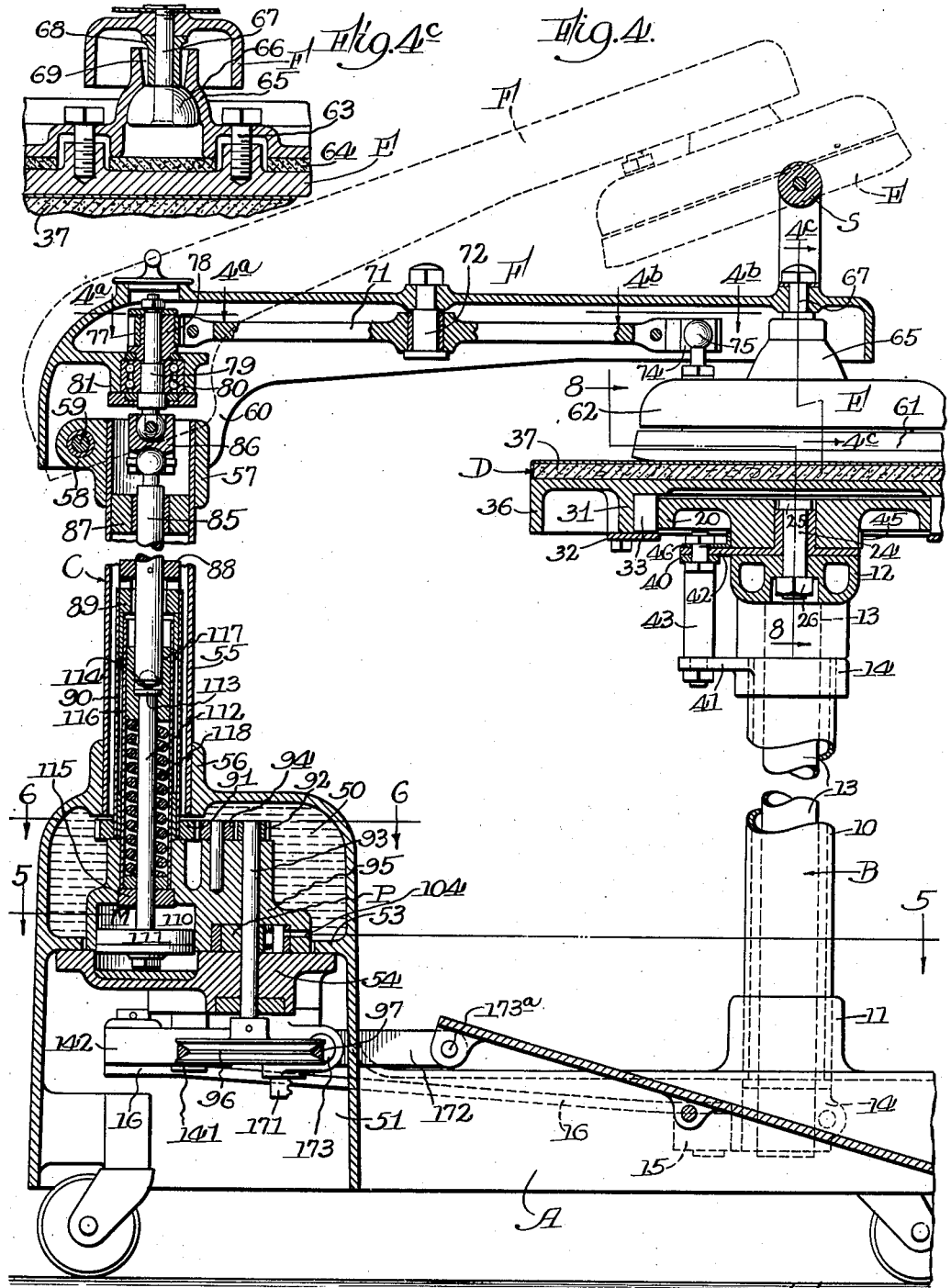

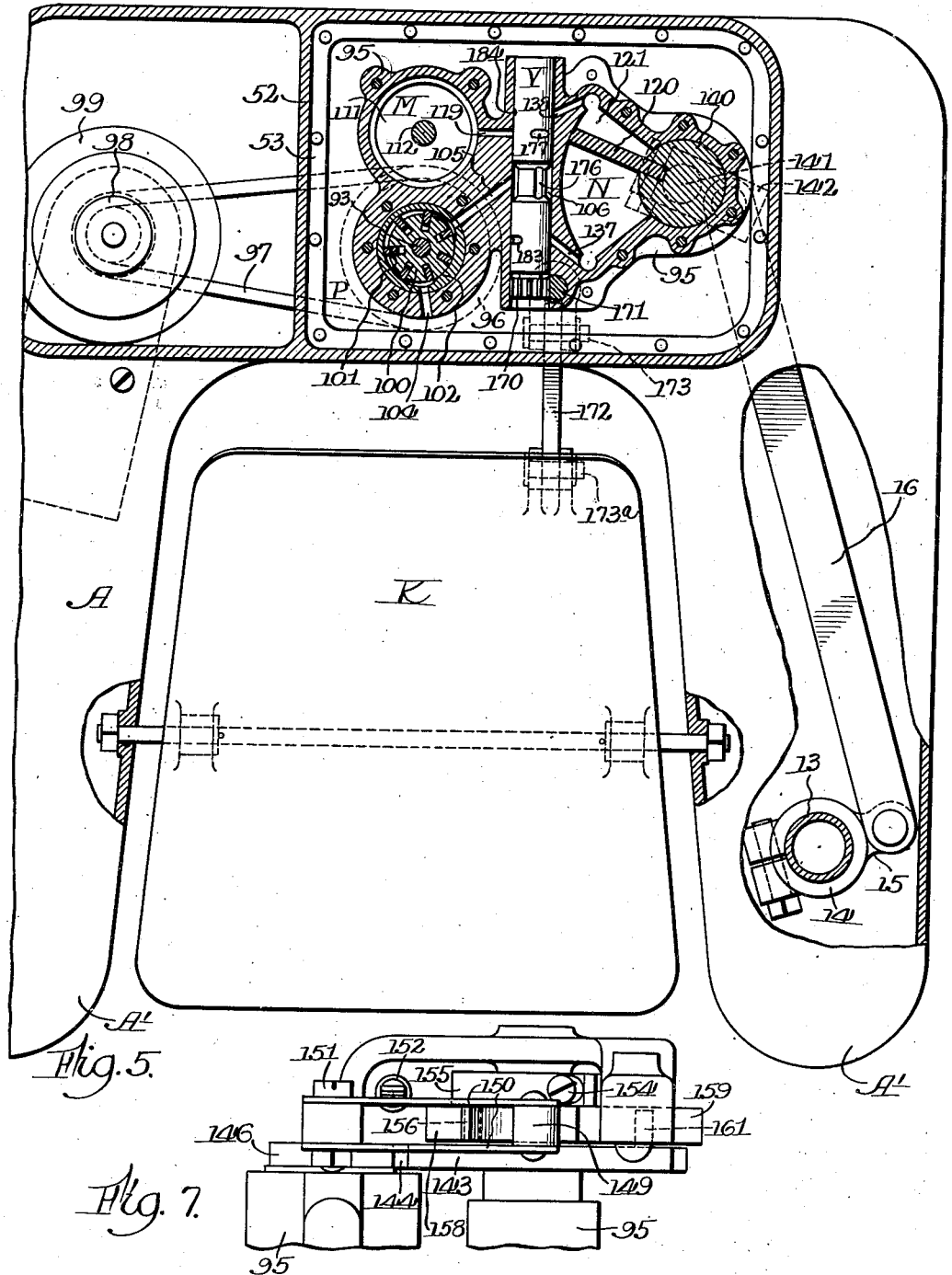

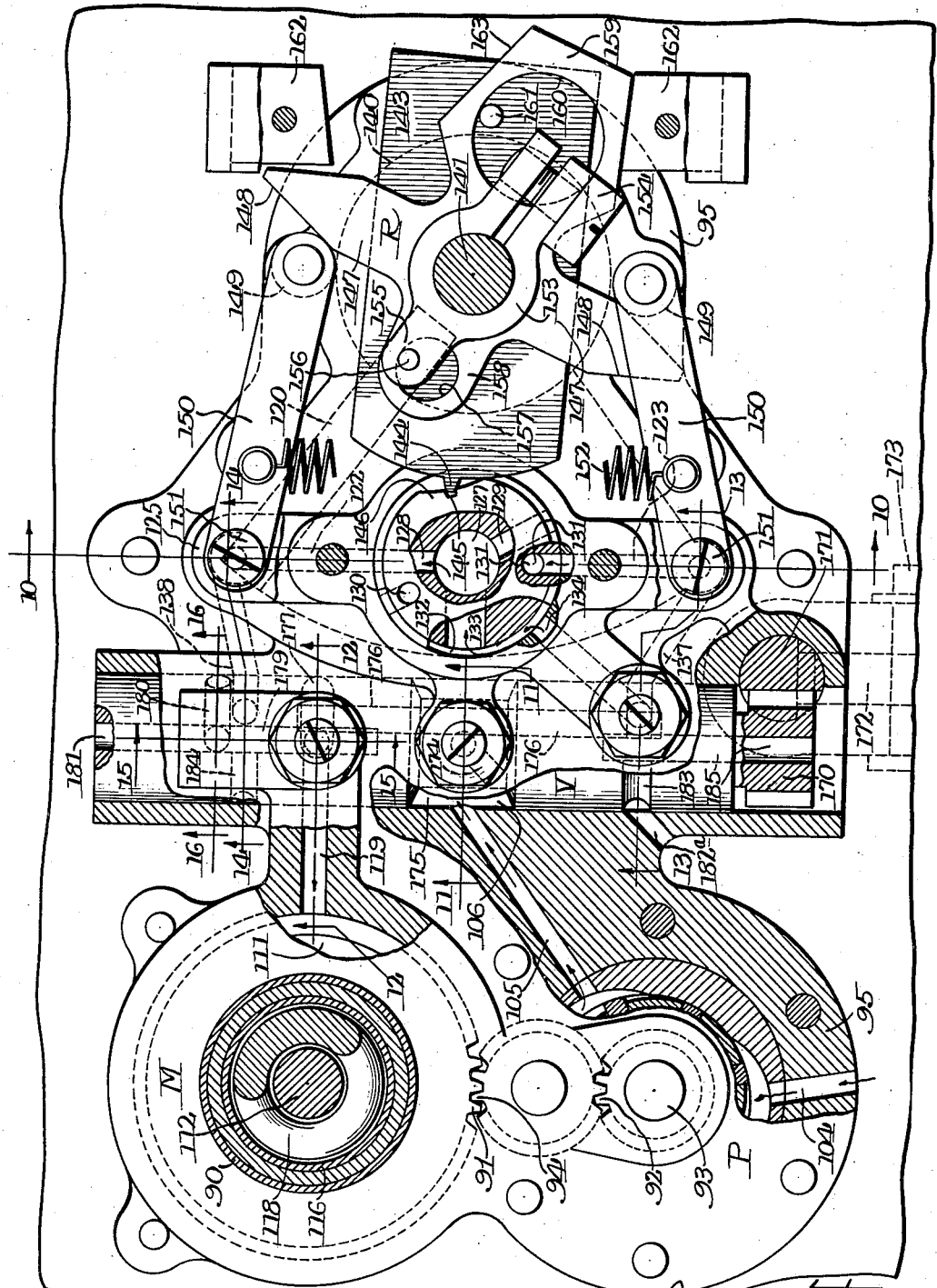

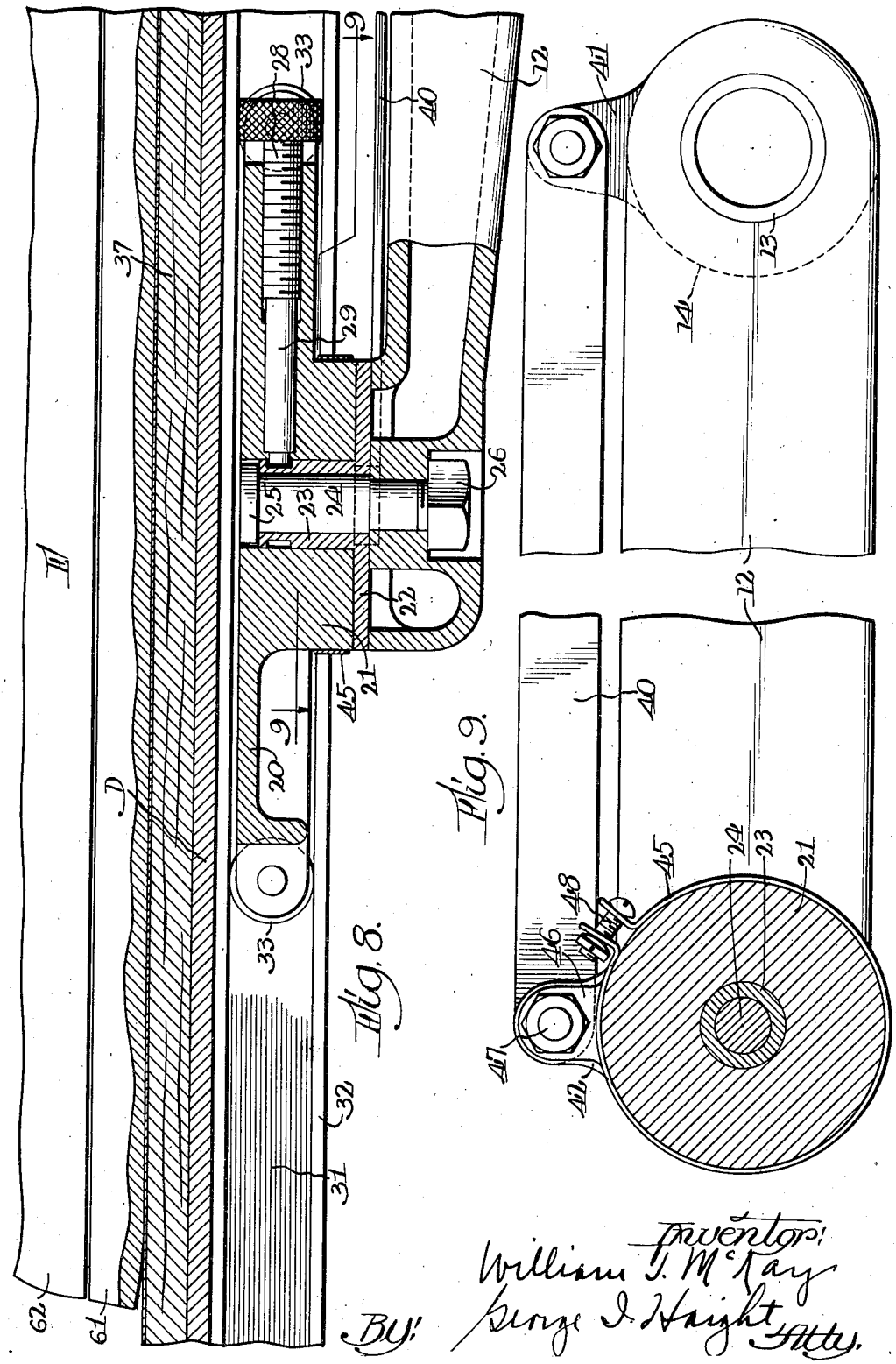

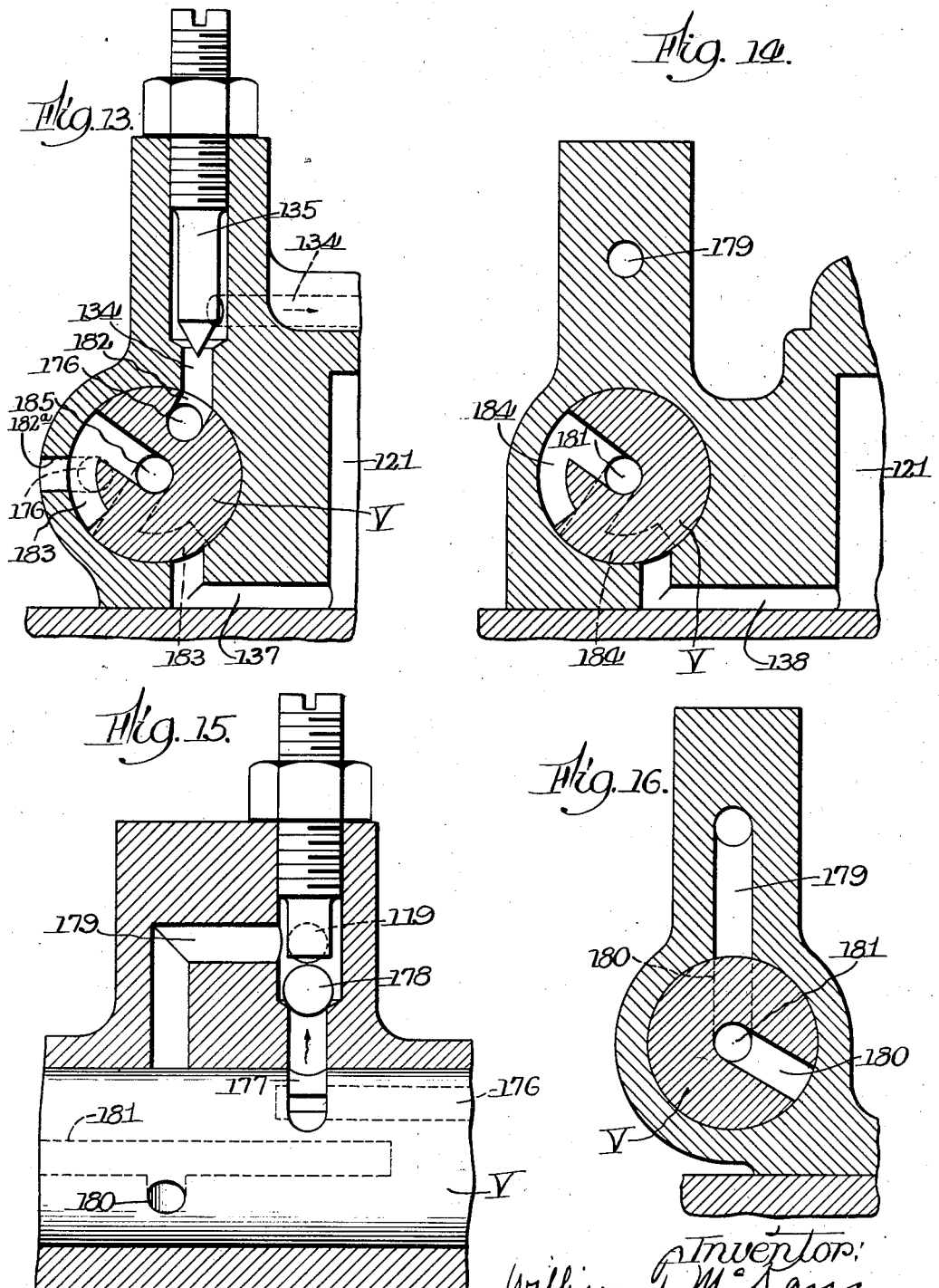

Patented Jan. 3, 1939

2,142,202

UNITED STATES PATENT OFFICE 2,142,202

IRONING AND PRESSING MACHINE

William T. McKay, Chicago Heights, Ill.

Application January 26, 1934, Serial No. 708,434

29 Claims. (Cl. 38—26)

My invention relates to improvements in ironing machines.

The general object of my invention is to provide an ironing machine which has all of the flexibility and universal range of use of the manually operated hand iron, but in which the operations are performed by power under the convenient control of the operator.

Another object is to provide for the universal positioning of the work relatively to the ironing shoe for the purpose of enabling the machine to handle all classes of ironing and pressing operations without manual effort and at a rapid rate of speed and efficiency.

Other objects and advantages of my invention will appear from the accompanying drawings and description of an ironing machine structure in which my invention is embodied and by which it is exemplified.

The invention comprehends a flat surfaced, relatively stationary ironing or pressing shoe, and a flat surfaced work table or board upon which the work is spread and which reciprocates to carry the portions of the work into ironing relation to the shoe. The work table is also universally movable relatively to the shoe so that any class of work on the table can be positioned in the required relation to the shoe by moving the table as desired. The shoe is vibrated to facilitate the rubbing or smoothing operation and is raised and lowered by power with respect to the table to facilitate the placement on and removal of the work on the table.

The invention comprehends a compact portable structure in which the parts are arranged and combined in the manner best calculated to carry out the objects and purposes of the invention.

Referring to the accompanying drawings,

Fig. 1 is a general view in side elevation of an ironing machine embodying my invention;

Fig. 2 is a general view in front elevation of said machine;

Fig. 3 is a general top plan view of the machine shown in Figs. 1 and 2, various positions of the work table or board being indicated by dotted lines to illustrate the range of operation of the table;

Fig. 4 is a vertical central section of the entire machine, taken substantially on the line 4—4 of Fig. 2;

Fig. 4a is a detail section on the line 4a—4a of Fig. 4;

Fig. 4b is a detail plan view of the forward end of the shoe vibrating lever, viewed on the line 4b—4b of Fig. 4;

Fig. 4c is a detail vertical section on the line 4c—4c of Fig. 4;

Fig. 5 is a horizontal sectional view on the line 5—5 of Fig. 4;

Fig. 6 is an enlarged detail plan view, partly in section, on the line 6—6 of Fig. 4, illustrating the fluid pump, the arm operating mechanism, automatic table actuating mechanism, and the control valves therefor;

Fig. 7 is a detail side elevation of portions of the automatic valve controlling mechanism;

Fig. 8 is an enlarged vertical section of the table and the swinging arm support therefor, taken substantially on the line 8—8 of Fig. 4;

Fig. 9 is an enlarged horizontal section on the line 9—9 of Fig. 8, illustrating the parallel link connection for maintaining the parallelism of the table;

Fig. 10 is a detail vertical section of the fluid operated motor and the associated automatic valve, taken on the line 10—10 of Fig. 6;

Fig. 11 is a detail section on the line 11—11 of Fig. 6;

Fig. 12 is a detail section on the line 12—12 of Fig. 6;

Fig. 13 is a detail section on the line 13—13 of Fig. 6;

Fig. 14 is a detail section on the line 14—14 of Fig. 6;

Fig. 15 is a detail section on the line 15—15 of Fig. 6; and

Fig. 16 is a detail section on the line 16—16 of Fig. 6.

The machine illustrated in the drawings, referring more particularly to Figs. 1 and 2, comprises in general a supporting base A from which rises a forward standard B and a rearward standard C. The upper end of the standard B supports the horizontally disposed flat work table or ironing board D upon which the work to be ironed is supported and by which the work is moved relatively to an ironing shoe E. At the upper end of the standard C is a hinged arm F which carries the ironing shoe E at its outer end and which raises and lowers the shoe with respect to the work table.

An elongated, open-ended basket or trough G is positioned between the two standards to receive the laundered clothes from the work table. This basket is conveniently mounted on a bracket H which is hinged on a collar J fastened on the standard C. The base A has two forwardly projecting branches A¹ which are spaced apart to provide room for a foot treadle K by which the operator conveniently controls the various operations while seated in front of the machine.

The standard B extends upwardly from the forward end of one of the branches A¹ of the base, whereby to leave a clear open space for the operator in front of the machine. This standard comprises a tubular member 10 anchored at its lower end in a boss 11 on the right-hand branch A¹ of the base. This tube supports at its upper end a horizontally swingable arm 12 which carries the work table or board D at its outer end. A tubular rock shaft 13 extends upwardly within the tubular standard 10 and beyond the upper end thereof. The hub end of the swinging arm 12 is fastened to the upper end of the shaft 13. A bearing for the hub end of the arm 12 is provided by the collar 14 which is secured to the upper end of the tubular standard 10. The lower end of the rock shaft 13 extends downwardly into the branch A¹ and has a split collar 14 clamped thereon. The collar has an arm 15 pivotally connected to a link 16 (Fig. 5) which extends rearwardly into the base housing of the machine and which is connected to fluid driven motor mechanism N (hereinafter described) for the purpose of swinging the arm 12 and thereby reciprocating the work table with a horizontal forward and backward movement relatively to the ironing shoe.

The work table is supported on the outer end of the arm 12 and is rotatable in a horizontal plane on an axis which is substantially coincident with the center of the ironing shoe, as shown more clearly in Fig. 2. A carrier plate 20 (Figs. 4 and 8) for the work table is rotatably mounted on a stud shaft 24 fastened on the outer end of the arm 12 by the nut 26. The carrier plate has a central cylindrical hub 21 which is supported upon the upper face of the arm, a bearing washer 22 being interposed between said face and the hub. The washer has an integral bushing 23 rotatable on the stud shaft 24, and is held in place by the flange 25 on the upper end of shaft 24. A long set screw 28 is threaded into a suitable bore in the carrier plate and its inner end 29 extends into a groove in bushing 23 for the purpose of locking the carrier without interfering with the rotation of the carrier. The set screw has a knurled head by which it can be conveniently manipulated to remove the carrier and table from its support. This construction provides for the rotation of the table through a complete circle, and enables the operator to position the clothes on the table at any desired angle with respect to the ironing shoe. Two of these positions are indicated by the dotted lines 29 in Fig. 3.

Provision is also made for the movement of the table longitudinally of itself upon its support, as illustrated by the dotted line positions 30 in Fig. 3. The table is mounted to slide on the carrier 20. The table is provided on its under side with parallel ribs 31 spaced apart to provide space therebetween for the carrier plate 20. These ribs have overhanging guard strips 32 along their lower edges, which provide guide channels for the rollers 33 (Figs. 4 and 8) mounted at the four corners of the carrier plate, whereby the table can ride on these rollers. This construction enables the table to be moved longitudinally of itself very easily and without effort on the part of the operator, and gives the operator a complete range of adjustment of the clothes relatively to the ironing shoe.

The table may be of any suitable size and shape best adapted for the purpose. The table shown in the drawing is in the form of a flat elongated plate which is substantially rectangular, except one end portion which has its side edges tapered to a more or less blunt point 34 which is a desirable shape for certain classes of work to be laundered. At its other end, the corners 35 are rounded off. The board is preferably made as a metal casting or stamping with a marginal depending rib 36 for strength. The upper surface of the table is provided with a suitable padding 37.

As hereinbefore mentioned, the table has a bodily reciprocating movement forward and backward, as indicated by the dotted lines 38, Fig. 3, by virtue of its being mounted on the swinging arm 12. This forward and backward movement is power actuated, as hereinafter described, to maintain an ironing operation by the movement of the work relatively to the stationary shoe without any effort on the part of the operator. On account of the wide range of movement of the table, the rapidity with which the table is reciprocated and the relatively large area of ironing surface of the shoe, large areas of clothes can be rapidly and effectively ironed. It is understood, of course, that while the table is being reciprocated, the operator can also rotate the table on its own axis or shift it longitudinally of itself to increase the ironing range.

It is desirable, especially when the table is reciprocated or oscillated by power, to maintain the parallel relation of the table through the range of oscillating movement, even though the bodily movement of the table is in an arc about the axis of the swinging arm. For this purpose, a link 40 (Figs. 1, 4, 8 and 9) is connected between the standard B and the table. One end of this link is pivotally connected to a fixed short arm 41 on the collar 14 on the standard B. The other end of the link is pivotally connected to an arm 42 extending from the bearing washer 22. A spacer 43 is provided between the end of the link 40 and the arm 41 for the purpose of bringing the link up to a substantially horizontal position. In addition to this, a flexible band 45 surrounds the hub 21 of the carrier and has a lug 46 connected with the end of the link and the arm 42 of the washer by the pivotal bolt 47. This band frictionally grips the carrier hub so that the movement of the link correspondingly rotates the table on its own axis. By virtue of this parallelogram arrangement between the link, arm 12 and table, the rotation of the swinging arm causes the table to be given a compensating rotation on its own axis sufficient to maintain the parallelism of the table during its bodily movement. The friction exerted by the band 45 is sufficient for the purpose mentioned, but is not great enough to prevent the independent rotation of the table on its axis when the operator chooses to turn it. This frictional connection can be regulated by the adjustment bolt 48 which connects the two ends of the flexible band 45 (Fig. 9).

The rear portion of the base is enlarged to form a housing in which the driving motor and the operating mechanism are contained. The upper portion of the base housing (Figs. 4 and 5) forms a reservoir or container 50 for the oil or fluid which is used to operate the mechanism, and the lower portion forms a compartment 51 which houses an electric motor. The fluid reservoir is divided off by the vertical partition 52 by the casing portion 54 which forms a part of the unitary structure which includes the fluid pump, actuating cylinder, reciprocating motor and control valve. This casing member has a marginal flange which is bolted to the instanding flange 53 of the housing to seal the reservoir.

The rear standard C comprises a tubular post 55, the lower end of which is fastened in a boss 56 of the base housing, and the upper end of which carries a fixed collar 57. This collar has an outstanding lug 58 on which the ironing shoe arm F is hinged by means of the hinge pin 59. The arm F is preferably channel-shaped in construction and its rear end 60 is enlarged to form a sort of cap covering the upper end of the standard to conceal and protect the operating mechanism associated therewith. The side walls of this cap-shaped end embrace the hinge lug 58, and the hinge pin 59 extends through these walls.

The forward or outer end of the arm supports the ironing shoe E in a flexible manner to permit the shoe to adapt itself to any irregularities between itself and the table and enable the shoe to press uniformly upon all portions of its surface. This shoe comprises a flat plate 61 and a cover member 62 (Figs. 4, 4c and 8) which are clamped together by the bolts 63 with a layer of insulating material 64 therebetween. The shoe may be heated in any suitable manner, such as by gas or electricity. The shoe may also be of any suitable shape for the purpose—preferably, however, it is somewhat oval-shaped as indicated in Fig. 3, so that it will have bluntly pointed ends enabling it to enter ruffles and other irregular places in clothes to be ironed. A centrally located upstanding boss 65 on the cover forms a socket for a ball member 66 carried by a stud bolt 67 extending downwardly from the arm. A bushing 68 surrounds the bolt between the ball member and the arm, and is positioned within a tapered opening 69 in the boss. This construction provides a limited universal joint connection between the arm and shoe, which enables the shoe to be automatically positioned for uniform pressure of the shoe.

One of the features of the invention is the provision of a vibrating movement for the shoe to simulate the rubbing action employed with hand irons. As indicated in Fig. 3, the dotted lines 70 indicate the range of vibratory movement. A lever 71 extends lengthwise within the arm F and is fulcrumed on the stud 72 fastened on the arm. The forward or outer end of this lever has a forked or divided end 73 (Fig. 4b) having bearing members 74 between which the ball end 75 of a stud is positioned, the stud being mounted on the shoe to the rear of its axis. This construction forms a universal pivotal connection between the shoe and lever and when the lever is rocked about its fulcrum, an oscillatory or vibratory rotary motion is imparted to the shoe. The rear end of the lever likewise has a divided or forked member 76 (Fig. 4a) between which a slide block 77 is positioned. An eccentric 78 is journaled in the block and is mounted on a shaft 79 which is journaled in ball bearings 80 supported by an instanding bracket 81 formed integrally with the rear cap end of the arm.

Rotation is imparted to the shaft 79 through the medium of a shaft 85, the two shafts being connected by a universal coupling 86 which adapts itself to longitudinal movement of the shaft in the operation of raising and lowering the arm, as hereinafter described. The shaft 85 has a bearing 87 in the upper end portion of the standard 55, and below this bearing the shaft has keyed to it one member 88 of a toothed clutch or coupling. The other clutch member 89 is carried at the upper end of a tubular shaft 90, the lower end of which has a gear 91 which is driven by the pinion 92 on a vertical drive shaft 93 through the medium of an idler gear 94. The clutch members 88 and 89 are engaged and form a driving connection between the shafts 85 and 90 for vibrating the shoe when the shoe is in lowered position on the table. Longitudinal movement of the shaft 85 to raise the shoe disconnects the clutch members and stops the vibration of the shoe.

The shaft 93 is journaled in suitable bearings in the upper portion 95 and lower portion 54 of the casing of the power mechanism. Its lower end has a grooved pulley 96 driven by a belt 97 from the pulley 98 of a suitable electric motor 99 (Fig. 5) mounted in the base housing. Thus, when the motor 99 is running and the shoe is lowered upon the table, it drives the shoe vibrating mechanism just described, and constantly vibrates the shoe.

As before mentioned, the power mechanism which includes the fluid pressure pump, the hydraulic cylinder and piston for raising and lowering the shoe, the fluid actuated oscillating motor for reciprocating the work table, and the control valve mechanism, comprises a unitary structure positioned within the base housing and arranged so that it can be removed or replaced as a unit. The parts of this unitary structure are all carried by a casing which is made up of the upper portion 95 and the lower portion 54 (Figs. 4, 5 and 6, and 10 to 16, inclusive), the lower portion 54 forming in a sense a cap plate for the casing member 95 and having marginal flanges which are bolted to the under side of the flanges 53 of the base housing. The portion or member 95 of the casing is positioned within the fluid reservoir 50 of the base housing.

The casing encloses the pump P which may be of any suitable type for the purpose. That which is shown in the drawings includes a rotor 100 equipped with radial vanes 101 and operating within a suitable chamber 102 formed in the housing. The rotor is mounted upon and driven by the motor driven shaft 93. An inlet port 104 admits fluid from the reservoir to the pump, and an outlet passage 105 leads to the cylindrical chamber 106 of the rotary control valve V by which oil is distributed to the various operating mechanisms (Fig. 6), all of the fluid delivered by the pump for this purpose being supplied through the outlet passage 105.

The operating cylinder and piston M for raising and lowering the shoe is included in the unit casing adjacent the pump P. Referring more particularly to Figs. 4, 5 and 6, it will be seen that the cylinder chamber 110 has a vertically movable piston 111 therein, from which a piston rod 112 extends upwardly. The upper end of the piston rod has a flange head 113 bearing against the lower end of the shaft 85, with a ball thrust bearing 114 interposed therein. A suitable stuffing gland 115 forming a fixed bearing for the piston rod is provided at the head of the cylinder chamber. A tubular member 116 is secured at its lower end to the housing member 95 and extends upwardly within the tubular shaft 90. In its upper end the tubular member carries a cylindrical block 117 which is slidable in said tube, and through which the piston rod is slidable. The upper end of the sliding block is provided with a bore of larger diameter to receive the lower end of the shaft 85, and to form an internal shoulder which is engaged by the flanged head 113 of the piston rod. Within the tube 116 and between the sliding block 117 and the lower fixed bearing 115 is a coiled spring 118. This spring is sufficiently strong to hold the shoe arm normally in an elevated position with the shoe clear of the table as indicated in dotted lines in Fig. 4, and to raise the arm and shoe to this elevated position each time the spring is released. The spring acts against the sliding block 117, forcing it upwardly in the tube 116, and, through the medium of the shaft 85 and universal joint 86, swings the shoe arm about its hinge.

When the shoe is to be lowered to ironing position upon the table, fluid under pressure is admitted to the cylinder chamber 110 above the piston. This forces the piston downwardly and, through the medium of the piston rod and its flanged head and the sliding block 117, compresses the spring and permits the weight of the arm and the ironing shoe to lower the shoe upon the work table. When the shoe is to be raised, the cylinder is relieved of fluid pressure, thereby releasing the action of the spring, as before described. The cylinder chamber 110 has a single port 119 through which the fluid is admitted to the cylinder and discharged therefrom, this port terminating in the chamber of the valve V (Fig. 6).

The oscillating motor N (Figs. 4 and 6) which reciprocates the work table, comprises a vane 120 operating in a segmental-shaped chamber 121 to which the fluid under pressure is admitted on either side of the vane to reciprocate the vane within the chamber, the fluid on the opposite side of the vane, of course, being relieved of pressure and exhausted into the reservoir. For this purpose, the ends of the vane chamber 121 are connected with passages 122 and 123 (Fig. 10) which terminate as ports in the chamber of a cylindrical reversing valve member 124 which serves to connect one of these passages with the fluid under pressure and at the same time connect the opposite passage with the reservoir, these passages all being suitably formed in the upper casing member 95 of the unit.

The reversing valve 124 comprises a cylindrical member rotatable in a close-fitting socket or chamber in the casing member 95 and held in place by a bridge member 125 bolted to said casing. A ball thrust bearing 126 is positioned in a bearing socket in the upper end of the valve member 124 and bears against the underside of the bridge to reduce friction so that the valve member can be easily rotated when there is pressure in chambers and passages. The reversing valve member 124 has a central chamber 127 which is supplied with fluid under pressure. This chamber has two outlet ports 128 and 129 (Figs. 6 and 10) angularly disposed with respect to each other, so that when the port 128, for instance, is in communication with the passage 122, the opposite port 129 will be closed to the passage 123, and vice versa.

The valve member also has two angularly related exhaust ports 130 and 131 disposed so that when one of the exhaust ports is connected to one of the passages from the vane chamber, the other exhaust port will be closed to the opposite passage from the vane chamber. Thus, as shown in Fig. 10, when the reversing valve member is connected to supply fluid under pressure to the passage 122 and the corresponding end of the vane chamber, the other end of the vane chamber and its passage 123 will be connected to the valve exhaust port 131. The valve member 124 has a peripheral groove 132 at its lower end, which is in constant communication with the central valve chamber 127 through a port 133. The casing has a passage 134 (Figs. 6 and 13) communicating with this reversing valve groove 132, this passage terminating as a port in the valve chamber of the rotary control valve V, and through this passage 134 fluid under pressure is delivered to the reversing valve and thence to the oscillating motor. In order to regulate the flow of fluid to the motor and thereby determine the speed of operation of the motor N, a valve 135 is interposed in this passage 134, as shown in Fig. 13. This valve simply consists of a needle stem having a tapered end and threaded so that it can be screwed toward or from its seat to vary the opening through the passage.

The ends of the vane chamber 121 are also connected with exhaust passages 137 and 138 which, as shown in Figs. 5, 13 and 14, terminate in ports in the valve chamber of the rotary valve V. During the operation of the motor N, these ports or passages 137 and 138 are both closed. In the normal or off position of the rotary valve V, however, both of these passages 137 and 138 are simultaneously open to the reservoir, and the purpose of this arrangement is to prevent resistance to the movement of the vane 120 of the motor and enable the operator to shift or reciprocate the work table manually through its range of movement. By thus relieving the motor N of pressure on both sides of the vane, the manual shifting of the work table will not be resisted by the motor N.

The vane 120 of the motor N is fastened to a hub 140 which is rotatably mounted in a suitably formed bearing in the casing member 95, as clearly shown in Fig. 5. This hub is on a shaft 141 journaled in bearings in the housing and extends below the bottom wall of said housing where it carries an arm 142 clamped thereon. This arm is pivotally connected to the rear end of the link 16 hereinbefore described, so that the power of the motor N is transmitted to the work table.

In order to make the operation of the motor N automatic, mechanism is provided which is arranged to automatically actuate the reversing valve 124 at the end of each stroke of the motor vane 120. Referring more particularly to Fig. 6, it will be seen that above the housing 95 a plate 143 is rotatably mounted on the motor shaft 141. The forward end of this plate is curved and carries a projecting tooth 144 which engages a notch 145 in the periphery of a collar 146 (Fig. 10) which is mounted upon the upper end of and fastened to the reversing valve member 124, so that when the plate 143 is rocked on the shaft it rotates the reversing valve member 124 sufficient to change the relation of the ports, as hereinbefore described.

Above the plate 143, a cross-shaped member R is also rotatably mounted upon the shaft 141. This cross-shaped member has two laterally extending arms 147, the outer ends 148 of which are tapered or beveled to form cams for cooperation with the rollers 149 which are carried on the ends of levers 150. The other ends of these levers are pivotally mounted by means of the screws 151 on the housing and the levers are yieldingly pulled toward each other by means of the spiral spring 152 connected to both of them. These levers are each made of two parallel upper and lower links or straps between which the rollers at the ends are positioned. This construction is arranged to provide a quick or snap action device for quickly rotating the reversing valve in proper timed relation to each end of the stroke of the motor vane, and the action is as follows:

When the cross-shaped member R is rotated, the cams or beveled ends of the arms 147 force the rollered ends of the levers 150 to swing outwardly against the tension of the spring 152 and store up energy in said spring until the rollers ride over the tips of the cam 148. Then the energy stored in the spring 152 pulls the levers toward each other and the rollers 149 ride on the opposite edges of the cam 148 and continue the rotation of the cross-shaped member R, but with a very rapid movement. This quick action takes place as the vane of the motor practically reaches the end of its stroke in the corresponding direction and at that instant brings about the rotation of the plate 143 to actuate the reversing valve 124. In order to provide a lost motion connection between the motor shaft 141 and the cross-shaped member R to permit this quick movement of the member R, a split collar 153 is clamped on the shaft 141 by the clamping screw 154, so that the collar rotates with the shaft. The collar has an arm 155 extending forwardly substantially in the plane of the motor vane 120, and this arm carries a pin 156 which extends downwardly into an opening 157 in an arm 158 of the cross-shaped member R. This opening 157 is equivalent to a slot in said arm and permits some movement of the pin 156 before it engages one end or the other of the slot opening 157. Thus, as shown in Fig. 6, the vane of the motor, in beginning a new stroke, moves a distance corresponding to the diameter of the slot opening 157 before the pin 156 engages the member R and starts rotating said member. This lost motion connection between the pin 156 and the slot opening 157 permits the member R to move quickly at the end of the stroke of the vane. Another arm 159 extends rearwardly from the cross-shaped member R, and this arm has a circular slot opening 160 into which a pin 161 projects upwardly from the rear end of the plate 143. The circular slot opening 160 is of such diameter that the member R can rotate independently of the pin 161 until said member R has just about completed its rotation, except for the quick movement imparted to it by the spring-actuated levers 150. At the time the member R begins its quick movement, the end of the circular slot 160 engages the pin 161 and the plate 143 is given a correspondingly quick movement to quickly actuate the reversing valve member 124. The fixed stops 162 are provided on opposite sides of the arm 159 of the member R to be engaged by the edges 163 to limit the movement of the member R. Thus it is seen that whenever fluid under pressure is supplied to the vane motor N through the passage 134 and the reversing valve, as hereinbefore described, the operation of the vane motor N will be reversed at the end of each stroke and the work table will be reciprocated backwardly and forwardly. The speed at which the table is reciprocated can be regulated by regulating the flow of the fluid through the passage 134 by means of the needle valve 135.

As before mentioned, the supply of fluid under pressure to the cylinder and to the motor N is governed by the rotary valve V which is arranged to be operated by the operator through the medium of the foot treadle K. The valve V is an elongated cylindrical member rotatably mounted in a corresponding cylindrical chamber or bore 166 in the housing 95. The forward end of this valve member is provided with a pinion gear 170 (Fig. 6), the teeth of which are engaged by the teeth of a vertically slidable rack bar 171 mounted in a suitable bearing in the housing. This rack bar is operated vertically to rotate the valve V, by means of a lever 172 (Fig. 4) which is pivoted at 173 in the housing and one end of which engages the rack bar 171 and the other end of which is pivotally connected at 173a to the foot treadle K. Thus the operator, by depressing the forward end of the treadle K, can rotate the valve V in one direction and by raising the forward end of the treadle can rotate the valve V in the opposite direction.

This rotary valve has a plurality of passages and ports which, in the rotation of the valve, register with the passages leading to the valve chamber, hereinbefore described, for the purpose of controlling the flow of fluid to and from the cylinder M and the reciprocating motor N. The valve is arranged to have three positions, one of which can be referred to as the off or normal position, the second as its intermediate position, and the third as the full operating position, the latter position being the one in which the fluid under pressure is admitted by the valve to both the cylinder and oscillating motor. The intermediate supplies fluid to the cylinder only to lower the shoe onto the table. In the drawings the valve is illustrated in its third or full operating position.

Midway of its length the valve V has a broad annular groove 175 which registers with and at all times is in communication with the main fluid pressure supply passage 105 from the pump. Since this port 175 is subject to pressure at all times, there is provided adjacent thereto in the casing a passage 174 (Fig. 11) which exhausts directly into the reservoir. This passage, however, is normally closed by a spring pressed ball relief valve 174a which can be adjusted to respond to any pressure by means of the screw 174b. In the event of excess or abnormal pressure, the valve opens and relieves the motor and parts from damage.

The valve has an internal longitudinal passage 176 extending both ways from the main annular groove 175 and in constant communication therewith. At one end this passage 176 terminates in a segmental port 177 (Figs. 6 and 12) which registers with the passage 119 for supplying fluid under pressure to the cylinder M. The segmental port 177 is extended circumferentially so that registration with passage 119 occurs when the valve has been rotated from its off position to its intermediate position. In this intermediate position the cylinder M receives fluid pressure in advance of the table reciprocating motor N and enables the shoe to be lowered without reciprocating the table. However, port 177 remains in registration when the valve is rotated to third or full operating position, so that the shoe remains lowered while the table reciprocates.

Interposed in the passage 119 (Fig. 15) is a ball check valve 178 which permits the fluid to flow into the cylinder M. The purpose of this check valve is to hold the pressure in the cylinder even though the pressure from the pump may, for any reason, be lessened. A branch passage 179 leads from the passage 119 and terminates in a port in the chamber of the valve V in position to register with an exhaust port 180 in said valve V. This exhaust port connects with an exhaust passage 181 in the valve V, which exhaust passage leads to the end of the valve and opens into the reservoir to discharge the fluid from the cylinder M back into the reservoir. While the valve V is in the third position the port 180, however, is out of register with the passage 179; hence, the fluid passes through the check valve 178 directly into the cylinder M for actuating the piston therein to lower the shoe, as hereinbefore described. When the valve V is returned to its off position, the exhaust port 180 registers with the passage 179 and releases the fluid from the cylinder which flows through the passage 119 and into the passage 179 and exhausts at the end of said passage 181. At its other end the main passage 176 terminates in a port 182 which, in the third position of the valve, registers with the passage 134 leading to the reversing valve 124 to supply fluid under pressure to the motor N. In the normal or off position of the valve, however, this port 182 registers with a port 182a in the casing leading directly into the reservoir (Figs. 6 and 13). This port 182a is provided so that the fluid will circulate freely in the off position of the valve, when neither the cylinder or reciprocating motor are operating, thus preventing building up pressure.

The valve V is also provided with segmental ports 183 (Fig. 13) and 184 (Fig. 14), which are adapted, in the off or normal position of the valve, to register with exhaust passages 137 and 138, respectively, leading from the ends of the motor chamber 121, as hereinbefore described. The port 183 communicates with an exhaust passage 185 in the valve V opening at the end of the valve into the reservoir, and the port 184 communicates with the exhaust passage 181 at the other end of the valve member V. Thus, in the off or normal position of the valve, the motor chamber 121, on both sides of the vane, is simultaneously connected with the exhaust to relieve the pressure on both sides of the vane. This enables the operator to swing the work table manually as desired, without pressure resistance in the motor N.

It will be seen that a simple movement of the foot treadle actuates the control valve through its range of control movements, and this valve admits and distributes the fluid under pressure to the cylinder M and to the reciprocating motor N. If it is desired to perform pressing operations without reciprocation of the table, the operator actuates the treadle sufficient to rotate the valve V into intermediate position, whereupon the cylinder M will be supplied with fluid pressure and the shoe will be lowered into pressing relation to the work table.

When it is desired to reciprocate the work table, the control valve is rotated further to full control position and the reciprocating motor will be supplied with fluid pressure. The shoe, of course, remains in lowered position while the table is reciprocating. It will be understood that since the shoe is vibrated by means independent of the fluid pressure operated mechanisms, it will continue so long as the electric driving motor 99 is running and the shoe is in lowered position.

A handle F is provided on the shoe in convenient position for the operator to manually increase the pressure of the shoe upon the work in the event this is found desirable for some classes of work.

It will be understood that changes may be made in the construction, operation and arrangement of various parts without departing from the spirit of the invention, and it is understood that I contemplate such changes as fairly fall within the scope of the appended claims.

I claim:

1. In an ironing machine of the class described, the combination of an ironing shoe, adapted to be raised and lowered, a horizontally disposed flat work table, means for reciprocating said table in a horizontal plane, and power actuated means for vibrating the shoe about a vertical axis in a plane parallel to said table.

2. In an ironing machine of the class described, the combination of a supporting member, a substantially flat horizontally disposed work table mounted on said support for rotation upon a vertical axis, power actuated means for bodily actuating said support to horizontally reciprocate said table, an ironing shoe mounted in relatively stationary ironing position with respect to said table, and power controlled means for raising the shoe relatively to the table.

3. In an ironing machine of the class described, the combination of a supporting member, a substantially flat horizontally disposed work table mounted on said support for rotation upon a vertical axis, power actuated means for bodily actuating said support to horizontally reciprocate said table, an ironing shoe mounted in relatively stationary ironing position with respect to said table, power controlled means for raising the shoe relatively to the table, and means for vibrating the shoe about a vertical axis in a plane parallel to said table.

4. In an ironing machine of the class described, the combination of a substantially flat horizontal work table shiftable longitudinally and rotatably in the plane of itself, a swingable support for said table, power actuated means for swinging said support to reciprocate the table bodily, an ironing shoe, and means supporting the shoe in stationary relation to the table.

5. In an ironing machine of the class described, the combination of a substantially flat horizontal work table shiftable longitudinally and rotatably in the plane of itself, a swingable support for said table, power actuated means for swinging said support to reciprocate the table bodily, means for maintaining the table in parallel relationship to itself as it reciprocates, a flat ironing shoe, a support for the shoe holding it in stationary relation to the table, means for raising the shoe with respect to the table, and fluid actuated mechanism controlling said raising means.

6. In an ironing machine of the class described, the combination of a substantially flat horizontal work table shiftable longitudinally and rotatably in the plane of itself, a swingable support for said table, power actuated means for swinging said support to reciprocate the table bodily, means for maintaining the table in parallel relationship to itself as it reciprocates, a flat ironing shoe, a support for the shoe holding it in stationary relation to the table, power controlled means for raising the shoe with respect to the table, and power actuated means for vibrating the shoe about a vertical axis in a plane parallel with the table.

7. In an ironing machine of the class described, the combination of a frame, an arm mounted on said frame for movement in a vertical plane, a flat ironing shoe carried on said arm, power mechanism for controlling the movement of said arm to raise and lower the shoe, a substantially flat work table, and means mounted on said frame and supporting said table for rotary and bodily movement in the plane of itself in ironing relation to the shoe in its lowered position, and a fluid operated mechanism for bodily moving said work table while the shoe is in pressing relation thereto.

8. In an ironing machine of the class described, the combination of a frame, an arm mounted on said frame for movement in a vertical plane, a flat ironing shoe carried on said arm, power mechanism for controlling the movement of said arm to raise and lower the shoe, a substantially flat work table supported by said frame in ironing relation to the shoe in its lowered position, and means for vibrating the shoe about a vertical axis in a plane parallel with the table.

9. In an ironing machine of the class described, the combination of a frame, an arm mounted on said frame for movement in a vertical plane, a flat ironing shoe carried on said arm, power mechanism for controlling the movement of said arm to raise and lower the shoe, a substantially flat work table, a horizontally swingable arm mounted on said frame for supporting the table in ironing relation to the shoe in its lowered position, and power means for swinging said table supporting arm to bodily reciprocate the table relatively to said ironing shoe.

10. In an ironing machine of the class described, the combination of a substantially flat reciprocable work table, an ironing shoe positioned above the table and mounted on a vertical axis, fluid actuated mechanism for reciprocating said table, and means for rocking the shoe on said axis in relation to the work on the reciprocating table.

11. In an ironing machine of the class described, the combination of an ironing shoe, a substantially flat reciprocable work table, a horizontally swingable arm supporting said table, fluid actuated mechanism for swinging said arm to reciprocate said table relatively to the shoe, a source of fluid under pressure for actuating said mechanism, and manually operated means for controlling said mechanism.

12. In an ironing machine of the class described, the combination of an ironing shoe, a substantially flat reciprocable work table, a fluid actuated motor for reciprocating said table relatively to said shoe, fluid actuated means for controlling the raising and lowering of the shoe relatively to the table, a manually operated control device for controlling the motor and fluid actuated means, and means acting when the shoe is lowered for oscillating the shoe relatively to the table.

13. In an ironing machine of the class described, the combination of a substantially flat, horizontally disposed work table, a horizontally swingable support for the table, a fluid operated motor for actuating said support to bodily reciprocate the table, a source of fluid under pressure for said motor and manually operated means for controlling the fluid to the motor, an ironing shoe, and means for raising and lowering said shoe relatively to said reciprocable table.

14. In an ironing machine of the class described, the combination of a substantially flat, horizontally disposed work table, a horizontally swingable support for the table, a fluid operated motor for actuating said support to bodily reciprocate the table rearwardly and forwardly with respect to the operator's position in front of said machine, a source of fluid under pressure for said motor, manually operated means for controlling the fluid to the motor, an ironing shoe, and a fluid operated mechanism for effecting the raising and lowering the shoe with respect to the table.

15. In an ironing machine of the class described, the combination of a frame including an upright standard, an ironing member mounted on the frame to be raised and lowered, a horizontally swingable arm mounted on said standard, a substantially flat horizontally disposed work table mounted on said arm for cooperation with said ironing member and movable longitudinally relatively to said ironing member, and power actuated means for swinging said arm to reciprocate said table transversely relatively to said shoe whereby to present any portion of the area of said table in ironing relation to the ironing member, and means to effect the raising and lowering of the ironing member while the table is in any of its positions.

16. In an ironing machine of the class described, the combination of a frame including an upright standard, an ironing member mounted on the frame to be raised and lowered, a horizontally swingable arm mounted on said standard, a substantially flat horizontally disposed work table rotatably mounted on said arm and adapted for cooperation with said ironing member when in its lower position, said table being movable horizontally, longitudinally of itself, power actuated means for swinging said arm to reciprocate the table transversely of itself while the ironing member is in pressing relation to the table, and means connected with said standard and with the table for maintaining the longitudinal axis of the table in parallel relationship to itself as the table is reciprocated.

17. In an ironing machine of the class described, the combination of a work table, an upright adjacent the table, an arm fulcrumed on said upright and overhanging the table, an ironing shoe mounted for oscillation on a vertical axis on said arm above the table, and power actuated means for oscillating said shoe with respect to the table.

18. In an ironing machine of the class described, the combination of a work table, an upright adjacent the table, an arm fulcrumed on said upright and overhanging the table, an ironing shoe mounted on said arm above the table, spring means acting on said arm to raise the shoe off of the table, and fluid operated means for counteracting said spring mechanism to permit the lowering of the shoe onto the table.

19. In an ironing machine of the class described, the combination of a work table, an upright adjacent the table, an arm fulcrumed on said upright and overhanging the table, an ironing shoe mounted on said arm above the table, power actuated means for controlling the swinging of said arm vertically to raise and lower the shoe with respect to the table, a lever mounted on said arm having one end connected with said shoe, and means connected with the other end of the lever for actuating said lever to vibrate the shoe when the shoe is in lowered position.

20. In an ironing machine of the class described, the combination of a supporting base including forwardly extending supporting branches spaced apart to provide space therebetween for the operator, an upright standard rising from one of said branches, a reciprocable work table mounted on said standard, power mechanism in said base for reciprocating said table, a second upright standard rising from said base, an arm fulcrumed on said second standard and overhanging the table, an ironing shoe mounted on said arm above the table, mechanism in said base effecting the swinging of said arm vertically to raise and lower the shoe with respect to the table, a control device for said mechanisms, and a treadle between said base branches for operating said control device.

21. In an ironing machine of the class described, the combination of a base, an upright standard rising from said base, a reciprocable work table mounted on said standard, power mechanism in said base for reciprocating said table, a second upright standard rising from said base, an arm fulcrumed on said second standard and overhanging the table, an ironing shoe mounted on said arm above the table, mechanism in said base to effect the swinging of said arm vertically to raise and lower the shoe with respect to the table, a control device for said power mechanism, and a treadle for operating said control device.

22. In an ironing machine of the class described, the combination of a frame, a work supporting table on said frame, a standard on said frame, an arm fulcrumed on said standard to swing vertically, an ironing shoe carried by said arm for movement into and out of pressing relation to said table, a spring in said standard acting to swing the arm and shoe upwardly, a cylinder, a piston mounted in said cylinder and acting on said spring and operable by fluid under pressure in the cylinder to overcome said spring and permit the arm and shoe to swing downwardly.

23. In an ironing machine of the class described, the combination of a base member having two forwardly extending supporting branches spaced apart to provide a position for the operator's feet, a treadle positioned between said branches, an upright on one of said branches at one side of the operator's position, a horizontally swingable arm mounted on said upright and extending over the operator's position, a work table carried by said arm, means controlled by the treadle for swinging said arm to reciprocate the table toward and away from the operator, and an ironing shoe movable up and down with relation to said work table.

24. In an ironing machine of the class described, the combination of a base member having two forwardly extending supporting branches spaced apart to provide a position for the operator's feet, a treadle positioned between said branches, an upright on one of said branches at one side of the operator's position, a horizontally swingable arm mounted on said upright and extending over the operator's position, a work table carried by said arm, a standard on said base, a vertically swinging arm mounted on said standard and extending forwardly, a shoe on said arm adapted to be raised and lowered with respect to the table, and means actuated by said treadle for controlling the operation of both of said arms.

25. In an ironing machine structure of the class described, the combination of a frame having a forwardly extending portion at one side of the operator's position, an upright on said portion, a movable supporting member extending laterally from said upright and overlying the operator's position, a horizontally disposed work table mounted on said supporting member for rotary movement and for movement longitudinally of itself, means in said frame and connected with said supporting member for actuating the supporting member to bodily reciprocate the work table toward and from the operator, and a movable pressing member overlying said work table for cooperation therewith.

26. In an ironing machine structure of the class described, the combination of a frame having a forwardly extending portion at one side of the operator's position, an upright on said portion, a movable supporting member extending laterally from said upright and overlying the operator's position, a horizontally disposed work table mounted on said supporting member for rotary movement and for movement longitudinally of itself, means in said frame and connected with said supporting member for actuating the supporting member to bodily reciprocate the work table toward and from the operator, a standard at the rear of said frame, a forwardly extending arm on said standard fulcrumed to swing vertically, an ironing shoe carried by said arm above the table, and means for raising and lowering said arm.

27. In an ironing machine structure of the class described, the combination of a frame having a forwardly extending portion at one side of the operator's position, an upright on said portion, a movable supporting member extending laterally from said upright and overlying the operator's position, a horizontally disposed work table mounted on said supporting member for rotary movement and for movement longitudinally of itself, means in said frame and connected with said supporting member for actuating the supporting member to bodily reciprocate the work table toward and from the operator, a standard at the rear of said frame, a forwardly extending arm on said standard fulcrumed to swing vertically, an ironing shoe carried by said arm above the table, means for raising and lowering said arm, a treadle mounted on said frame, and means actuated by said treadle for controlling the table reciprocating means and the raising and lowering means for said arm.

28. In an ironing machine of the class described, the combination of a base member having a forwardly extending branch member, an upright on said branch member at the side of the operator's position, a vertical shaft in said upright, a laterally extending arm on said upright and overlying the operator's position, a horizontally disposed work table mounted on said arm and adapted to be reciprocated thereby toward and from the operator, a fluid operated motor in the base connected with said vertical shaft for actuating the arm to reciprocate said table, and a pressing member overlying said work table for cooperation therewith.

29. In an ironing machine of the class described, the combination of a base member having a forwardly extending branch member, an upright on said branch member at the side of the operator's position, a vertical shaft in said upright, a laterally extending arm on said upright and overlying the operator's position, a horizontally disposed work table mounted on said arm and adapted to be reciprocated thereby toward and from the operator, a fluid operated motor in the base connected with said vertical shaft for actuating the arm to reciprocate said table, an upright supporting member at the rear of said base, an arm fulcrumed on said upright to swing vertically, an ironing shoe carried by the arm above the work table, spring means within the upright for raising the arm, and fluid operated means for controlling said spring to permit the lowering of said arm.

WILLIAM T. McKAY.